United States Patent [19]

Cranston

[11] 3,765,845

[45] Oct. 16, 1973

[54] APPARATUS FOR BONDING LEADS AND TESTING BOND STRENGTH

[75] Inventor: Benjamin H. Cranston, Trenton, N.J.

[73] Assignee: Western Electric Company, Incorporated, New York, N.Y.

[22] Filed: Nov. 3, 1971

[21] Appl. No.: 195,169

Related U.S. Application Data

[62] Division of Ser. No. 832,630, June 12, 1969, Pat. No. 3,634,930.

[52] U.S. Cl. .............................................. 29/191.6
[51] Int. Cl............................................. B32b 15/00
[58] Field of Search........................ 29/191.6, 191.4; 156/178

[56] References Cited

UNITED STATES PATENTS

| | | | |
|---|---|---|---|
| 2,290,842 | 7/1942 | Bush | 29/191.4 |
| 3,444,025 | 5/1969 | Hillas | 156/178 |
| 3,256,142 | 6/1966 | Devine | 29/191.6 |

*Primary Examiner*—A. B. Curtis
*Assistant Examiner*—O. F. Crutchfield
*Attorney*—H. J. Winegar et al.

[57] ABSTRACT

Bond strengths between bonded leads of electrical devices and conductive elements of circuit patterns are evaluated by pre-engaging a flexible member such as a wire or strip of metal with the electrical device prior to the making of the bond to be evaluated. The flexible member is engaged with the electrical device with a predetermined releasability so that, when the flexible member is pulled, the member releases from the device if the bonds are of satisfactory strength but the bonds rupture if they are of unsatisfactory strength and, in this instance, the flexible member remains intact. Particular utility resides in employing this system to evaluate bond strengths of leads of beam-lead integrated circuits or transistors when such devices are bonded to thin film circuits.

5 Claims, 17 Drawing Figures

APPARATUS FOR BONDING LEADS AND TESTING BOND STRENGTH

This is a division of, application Ser. No. 832,630 filed June 12, 1969, now U.S. Pat. No. 3,634,930.

BACKGROUND OF THE INVENTION

1. Field of the Invention

This invention relates to methods of and apparatus for making bonds between selected elements of workpieces and evaluating the strength of the bonds. More particularly, the invention relates to the making and evaluating of bonds between leads of electrical devices where flexible members are engaged with the devices with a predetermined releasability related in magnitude to desired bond strengths.

2. Description of the Prior Art

When electrical devices are combined into larger circuit configurations by the bonding of leads it is usually desirable to evaluate the soundness of the bonds produced. As electrical devices are made smaller and smaller, it becomes increasingly difficult to evaluate the soundness of the bonds. One example of a situation wherein such evaluation is particularly difficult is where beam-lead transistors or integrated-circuit chips are bonded to a thin-film conductive pattern that has been generated on a glass or ceramic substrate. To this period in time, bonds of this sort are being evaluated in a number of different ways, none of which is entirely satisfactory.

In the case of thermocompression bonding, optical gaging techniques are frequencly used. By looking through a microscope, an inspector can determine whether or not the beam leads have been squashed by the thermocompression bonding operation and the inspector can reject those bonds which do not appear to meet established visual standards. This is rather clearly a tedious and time consuming, as well as unsure, kind of inspection operation.

The visual technique of evaluating bonds is even more difficult in the case where bonds are made by the so-called compliant bonding technique, which is described in U.S. Pat. No. 3,533,155, issued to A. Coucoulas. In the compliant bonding system, deformation of the beam lead is only very slight and the difference between a properly and an improperly bonded beam lead is difficult to detect by visual techniques.

Another way of evaluating bonds is accomplished by destructively testing a statistical sample by such techniques as peel testing. The destructive testing is not entirely satisfactory either because of the expense associated with loss of products which must be destroyed during testing and, also, because of the inherent uncertainty which is necessarily associated with statistical testing.

Still another technique which has been utilized in evaluating bonds is to direct an air jet at the chip after bonding has taken place, and determining if the air jet tears away the chip from its position on the substrate with the presumption, of course, that those chips which remain intact being subjected to air jet treatment are held in position by good bonds. It can readily be seen that there are inherent difficulties in trying to assign quantitative parameters to such a test.

Yet another technique employed to evaluate bond strength is that of pressing on a body portion of a chip from the underside of the circuit through a hole in the substrate after the leads of the chip have been bonded to the conductive pattern on the substrate. This is accomplished by utilizing substrates with prepunched holes so that a probe can be inserted through the holes in order to apply the desired force on the chip.

Use of substrates with prepunched holes is undesirable because the holes can become collection points for contamination during the various processing steps needed to make the conductive pattern on the substrate.

With the above-described testing technique as well as the air jet testing technique the results of the test are only conclusive if most of the beam leads are unsoundly bonded and the chip consequently is torn away from its position on the substrate. Neither of the inserted probe technique nor the air jet technique is capable of identifying situations in which only one or two of perhaps 16 beam leads is unsoundly bonded. If only a few beam leads are unsoundly bonded, the chip would not be torn away from its position because the sound bonds would hold it in place.

Although it might be possible to detect electrically unsound bonds by further electrical testing, it would not be possible with the air jet or inserted probe techniques to identify those bonds which are potential electrical failures because of latent defects in mechanical strength.

SUMMARY OF THE INVENTION

It is, therefore, an object of the invention to provide a method of reliably evaluating the soundness of bonds between leads of an electrical device and conductive elements to which the leads are bonded.

Another object of the invention is the provision of a method by which the bond strengths of extremely small leads of an electrical device can be evaluated as discreet elements independently of other leads of the device.

It is still another object of the invention to provide a system by which workpieces can be introduced into a bonding position with each of the workpieces having associated therewith provisions for evaluating the soundness of bonds created at the bonding position.

The foregoing and other objects are accomplished in accordance with the invention by engaging a flexible member with a workpiece, bonding the workpiece into position and then applying force to the flexible member to either elongate the flexible member beyond a predetermined limit in cases where the bonding is sound or rupturing unsound bonds. The flexible member can comprise a strand which is threaded into engagement with the workpiece where the strand has a predetermined cross sectional area thus making the engagement one of predetermined releasibility; or the member may be a strip which is bonded to the workpiece with a predetermined releasability. When the flexible member is formed of a strip bonded to the workpiece, it is possible to evaluate individual bond strengths of a plurality of leads of very small devices or chips such as beam-lead integrated circuits or transistors.

DESCRIPTION OF THE DRAWINGS

Other objects, advantages and features of the invention will become apparent when read in conjunction with the following detailed drawings.

DETAILED DESCRIPTION

Illustratively, the invention is described in connection with bonding beam-lead type integrated circuit chips to conductive elements on thin-film circuit patterns formed on substrates. However, it is to be understood that this is only for purposes of explanation and that the invention has applicability to the bonding together of other types of workpieces.

Figure 1:
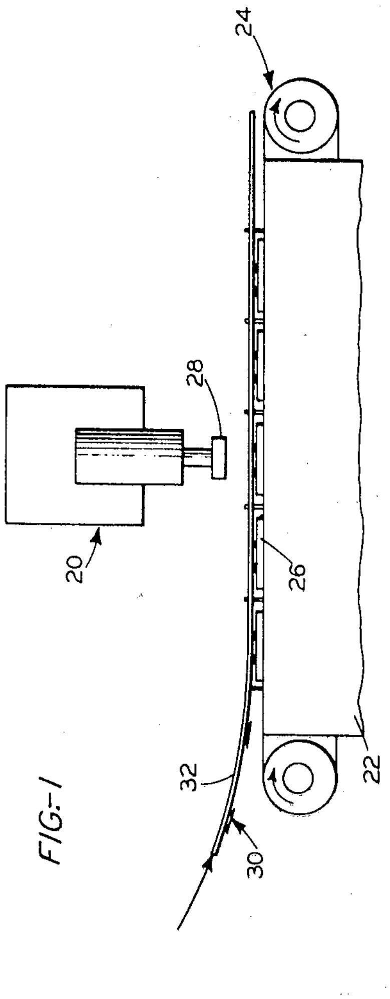
FIG. 1 is a simplified plan view of an automatic bonding apparatus which employs an inventive supporting strip for introducing workpieces thereto.

Referring now to FIG. 1, there is shown an automatic bonding machine, generally designated by the numeral 20. The bonding machine includes a base 22 on which a conveyor 24 is mounted. The conveyor 24 moves workpieces or substrates 26 past a bonding head, generally designated by the numeral 28. Positioned above the conveyor 24 and the substrates 26 is a supply of workpieces or integrated circuit or transistor chips 30 incorporated with a positioning strip 32. In the case where compliant bonding is being accomplished, the strip 32 can also be the compliant bonding medium. The positioning strip 32 is provided with indexing perforations 34 by which the strip can be properly keyed to travel in synchronization with the substrates 26 on the conveyor 24.

Figure 2:
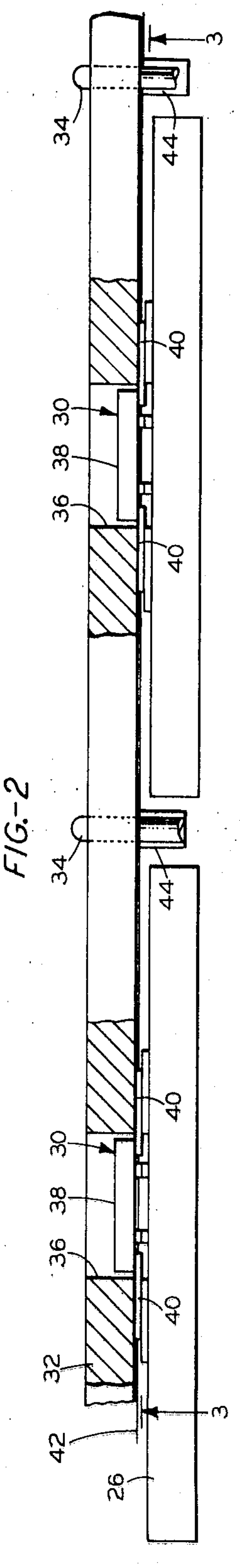
FIG. 2 is an enlarged partially sectioned view of beam lead chips incorporated with the supporting strip as they are positioned within the bonding apparatus of FIG. 1.

The detail of the incorporation of the chips 30 with the strip 32 is shown in FIG. 2. The strip 32 is provided with apertures 36 into which body portions 38 of the chip extend. Beam leads 40 of the chips 30 are accurately positioned with respect to the strip 32. Also, the indexing perforations 34 are accurately positioned with respect to the substrates 26 with the ultimate result that the chips 30 are accurately positioned with respect to the substrates 26 by the time any particular one of the substrates comes into position under the bonding head 28. Final adjustment of substrate-to-integrated circuit position can be made when the particular one of the chips 30 to be bonded is under the bonding head 28.

Figure 3:
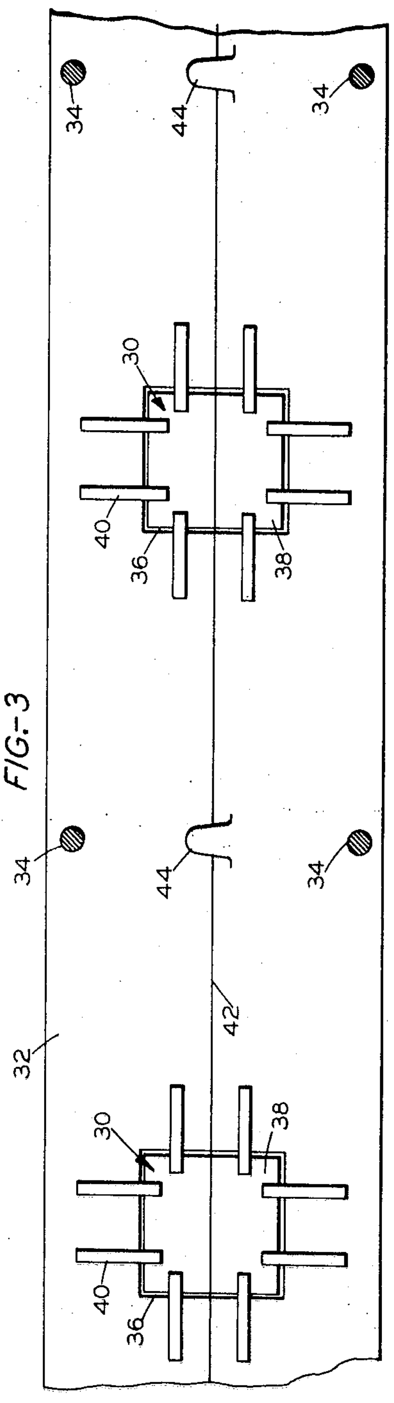
FIG. 3 is a view of the underside of the strip and beam-lead chips of FIG. 2.

One of the major problems associated with incorporating the chips 30 with the strip 32 is the need for a technique by which the chips can be held within their associated apertures 36. This is accomplished in the presently described example by the use of a flexible member or filamentary support strand 42 strung along the underside of the strip 32. The strand 42 is held against the strip 32 by tabs 44 formed in the strip. FIG. 3 more clearly shows the strand 42 engaged with the tabs 44 and the chips 30.

Figure 4:
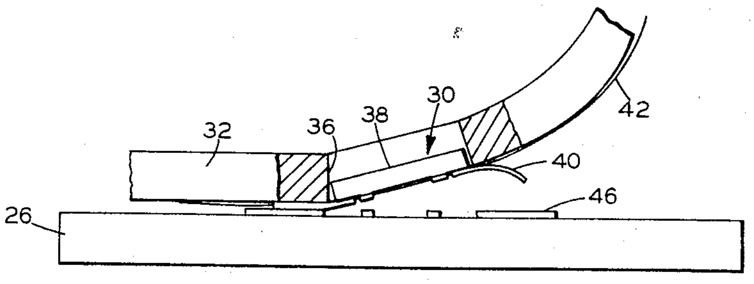
FIG. 4 is an illustration of the inventive arrangement detecting unsound bonds.
Figure 5:
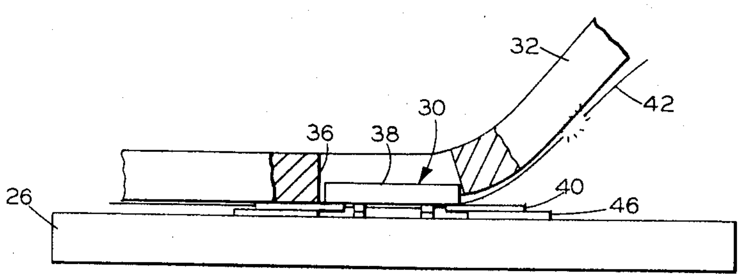
FIG. 5 is an illustration of the inventive arrangement in a situation where bonding is sound.

A unique advantage of the arrangement of the strand 42 holding the chips 30 within the strip 32 is shown in FIGS. 4 and 5 which illustrates the phenomenon which can occur when the strip 32 is lifted away from the substrate 26. Because the strand 42 has been positioned between the body portion 38 of the chip 30 and the substrate 26, lifting of the strip 32 and the strand 42 causes the strand to lift up on the chip 30. The strand 42 is chosen so that its tensile force is such that the strand will not break before lifting away the chips 30 which have bonded unsoundly.

A situation where unsound bonding exists is illustrated in FIG. 4. However, as can be seen in FIG. 5, if the bond strength between the beam leads 40 and the conductive elements 46 is satisfactorily high, the strand 42 will elongate beyond a predetermined limit or break. In other words, the strand 42 has been combined with the chip 30 with a predetermined releasability.

Typically, the bond strength between one of the beam leads 40 and the conductive elements 46 exceeds the tensile strength of the beam lead. Thus, in an example where the beam leads 40 of the chips 30 have a cross-sectional dimension of 0.003 inch × 0.0005 inch it is appropriate to provide the strand 42 with a yield strength of 8 grams. This yield strength would correspond approximately to the yield strength of one of the leads 40.

It has been found empirically that if the strand 42 possesses a tensile strength roughly equivalent to the tensile strength of one of the leads 40, the soundness of the bonding can be suitably evaluated. This is so because in most cases where faulty bonding exists, the total bond strength between all of the leads 40 and the conductive elements 46 does not exceed the tensile strength of one of the leads. Accordingly, a copper wire of a diameter 0.0005 inch was found suitable to evaluate bond strengths of typical beam-lead integrated circuits.

Of course, more exhaustive observation and greater experience might lead one to provide the strand 42 with a tensile strength equivalent to the strength of two or three of the leads 40 if a more rigorous test is desired. A feature of the invention, as embodied by the strand 42, is that a definite value of breaking strength can be assigned to the strand by selecting its cross-sectional area and material. Actual selection of strand parameters must be made by the user of the invention in relation to how rigorously he wishes test the bonds in question.

In most circumstances, the chips 30 have a passivating film over the active portions and, for that reason, the strand 42 can be conductive without causing any shorting between portions of the chip. However, if circumstances will not permit the use of a metallic material for the strand 42, the strand can be made of some polymer or other non-conductor with a known yield point, such as nylon.

Figure 6:
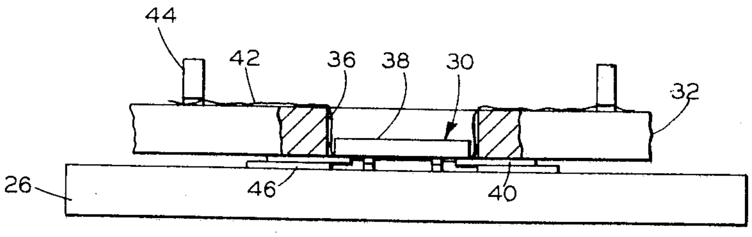
FIG. 6 is a view of an alternate arrangement of incorporation of a flexible member with a chip.

An alternate way of incorporating the chips 30 with the strip 32 is illustrated in FIG. 6. It can be seen in FIG. 6, that the strand 42 is threaded across the upper surface of the strip 32, down through the aperture 36, under the body portion 38, up through the aperture 36, and again across the top of the strip 32. The tabs 44 are formed along the top of the strip 32 in this case.

In the case illustrated in FIGS. 2 and 6, it can be recognized that the bonding of chips 30 can be evaluated very quickly for a long series of the substrates 26 by leaving the substrates in a line after emergence from under the bonding head 28 (FIG. 1). Pulling up on the strip 32 causes the strand 42 to perform its evaluation function on each of the chips 30 in the series. Even if the strand 42 breaks at one of the chips 30 it continues to be engaged with the strip 32 by the tabs 44 which are placed between each of the chips.

Figure 7:
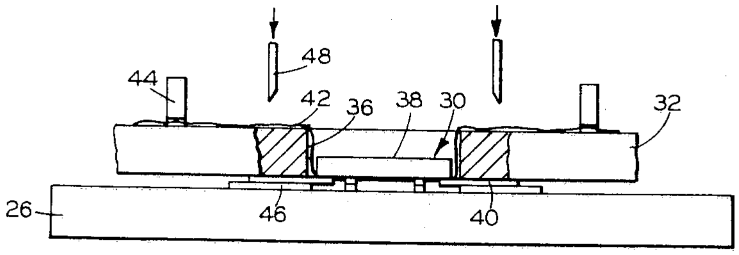
FIG. 7 is a view showing cutting blades operating to isolate a section of a flexible member of FIG. 6.

An advantage of the arrangement shown in FIG. 6 is shown in FIG. 7 where cutting blades 48 are used to cut the strand 42 on either side of the aperture 36 after bonding has been completed between the beam leads 40 and the conductive elements 46. The strip 32 can then be peeled away from the chip 30 leaving behind a portion of the strand 42 with upturned ends 50, as shown in FIG. 8.

Figure 8:
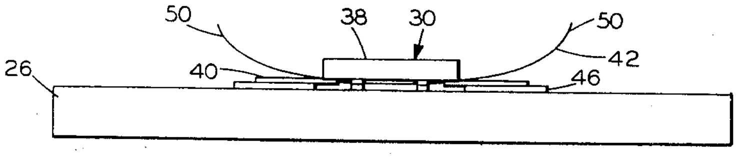
FIG. 8 is a view of the chip shown in FIG. 7 with the strip removed after cutting of the flexible member.

In the case of FIG. 8 where the strand 42 is disposed between the body portion 38 and the substrate 26, it is possible to pull directly on the upturned ends 50 of the strand 42 in order to evaluate the strength of the bonds between the beam leads 40 and the conductive elements 46. Pulling directly on the upturned ends 50 provides more uniform testing than the method where the strip 32 is pulled away from a series of the substrates 26.

Figure 9:
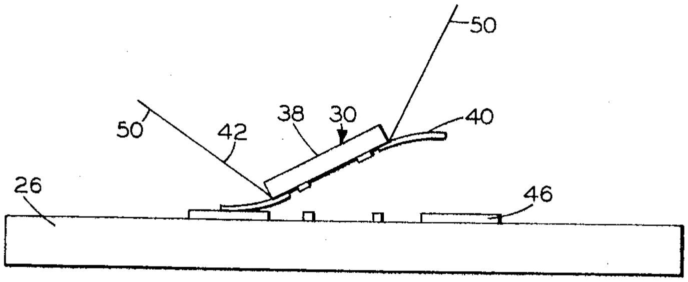
FIG. 9 is an illustration of an alternate embodiment of the inventive arrangement for detecting unsound bonds.
Figure 10:
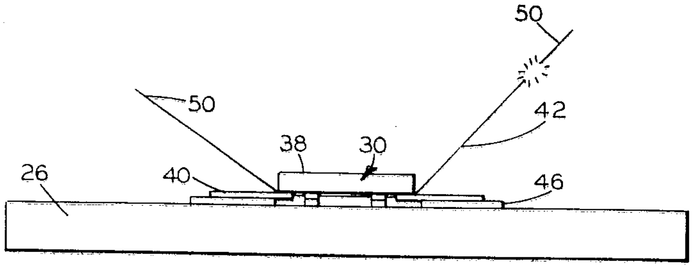
FIG. 10 is an illustration of the embodiment of FIG. 9 in a situation where bonds are sound.

FIG. 9 illustrates the result of the pulling on the strand 42 in the case where the bond strength is unsatisfactorily low or unsound, and FIG. 10 illustrates the strand 42 elongated behind a predetermined limit in the case where the bond strength is satisfactorily high or sound.

Figure 11:
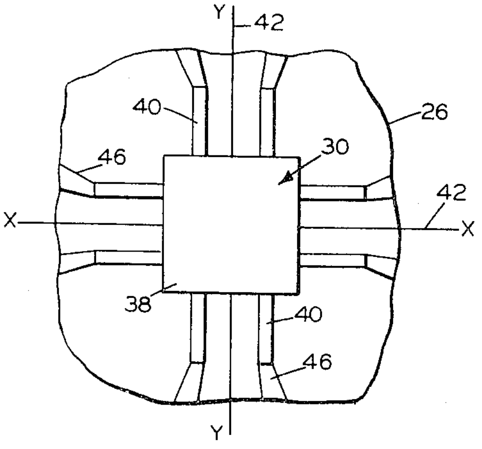
FIG. 11 is a plan view of a chip with which two transverse flexible members have been engaged in order to more uniformly evaluate bond strength.

Even more uniformity of testing can be provided by using more than one of the strands 42 and arranging them, as shown in FIG. 11. Thus, it is possible to evaluate, with nearly equal forces, the bond strengths of the beam leads 40 extending in the X direction as well as the beam leads extending in the Y direction.

Figure 12:
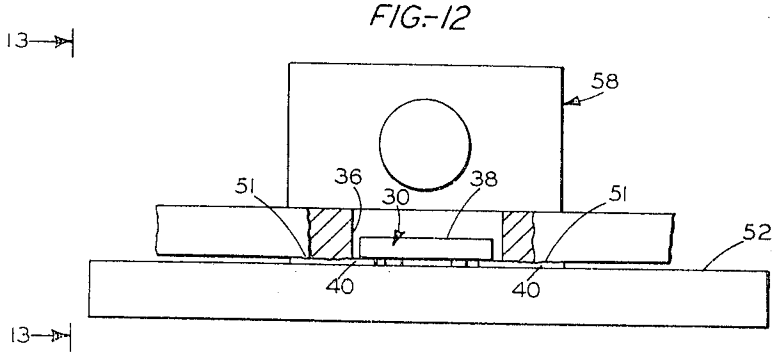
FIG. 12 is a view of a chip with which a compliant bonding member has been engaged between the member and leads of the chip.
Figure 13:
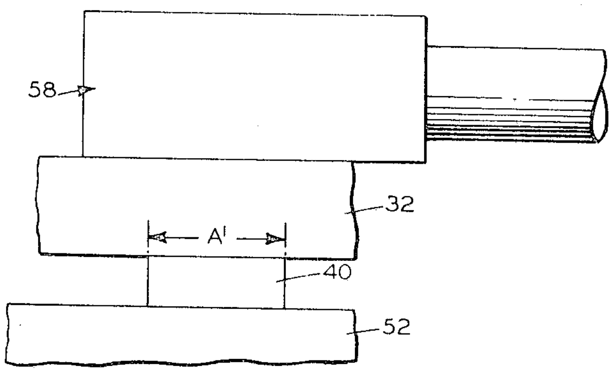
FIG. 13 is a sectional illustration of a lead being bonded to a strip of compliant bonding medium.

Another technique for combining the chips 30 with the strip 32 is illustrated in FIGS. 12 and 13. The strip 32 is lightly bonded to the tops of the beam leads 40 at an interface 51. This is done while the beam-lead chips are resting on a non-metallic surface 52, such as glass, so that bonding between the beam leads and the surface does not occur.

One example where the combining of the chips with the strip by lead bonding is particularly useful is in situations where compliant bonding is used to make the bonds between the leads 40 and the conductive elements 46 on a substrate 26. In compliant bonding, the compliant medium usually possesses an oxide film on its surface. The presence of the oxide film prevents good bonding between the lead which is to be bonded and the compliant medium and, of course, this prevention of bonding is desirable in that the compliant medium can be easily removed from the bond site after bonding is completed. An example of a good workable compliant bonding medium is type 2024 aluminum.

However, it is possible to cause bonding between the leads 40 and the strip 32 which, of course, in this example is the compliant bonding medium. As illustrated in FIG. 13, bonding between the strip 32 and the lead 40 can be accomplished by introducing ultrasonic agitation through an ultrasonic tool 58. The tool 58 introduces scrubbing forces parallel to the top surface of the lead 40. The scrubbing action breaks up the oxide film which is present on the strip 32 and causes some bonding to take place between the strip 32 and the lead 40.

Bonding occurs substantially throughout the area of contact between the strip 32 and the lead 40. This area is schematically designated as $A_1$ in the one-dimensional view shown in FIG. 13.

Figure 14:
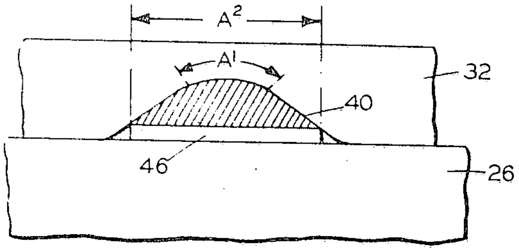
FIg. 14 is a sectional view of the lead of FIG. 13 after compliant bonding has taken place.

FIG. 14 illustrates the same portion of the lead 40 which was shown in FIG. 13 after compliant bonding has occurred between the lead 40 and one of the conductive elements 46. Further bonding between the strip 32 and the lead 40 beyond that which has occurred within area $A_1$ will not develop during the compliant bonding step. The oxide film which exists on the surface of the aluminum strip 32 prevents bonding between the strip and the lead 40 in those areas where the oxide film has not been scrubbed away by the ultrasonic tool, which was illustrated in FIG. 13. It can be seen that the compliant bonding mechanism has spread out the lead 40 and caused it to contact the conductive element 46 over an area represented schematically by $A_2$ in the one-dimensional representation of FIG. 14. The equivalent area of bonding between the strip 32 and the lead 40 is still shown as $A_1$ and, it can be seen that, $A_1$ is a substantially smaller area than $A_2$. In many cases the ratio between $A_1$ and $A_2$ is in the order of about 2:1.

It should be clear, then, that even if the bonding between the strip 32 and the lead 40 is equivalent in strength per unit area to the bonding between the lead 40 and the conductive element 46, the differences of area which exist would cause the overall bond strength between the strip 32 and the lead 40 to be roughly one-half of the bond strength between the lead 40 and the conductive element 46.

These bond strengths are different to an even greater extent than that which is contributed by differences in area because of the nature of the bonding mechanisms involved. An ultrasonic bond formed between the aluminum strip 32 and the lead 40, which is usually gold with a titanium surface at the interface between the strip 32 and the lead 40, is considerably weaker per unit area than a thermocompression bond which develops between the gold lead 40 and the conductive element 46, which is usually gold.

Figure 15:
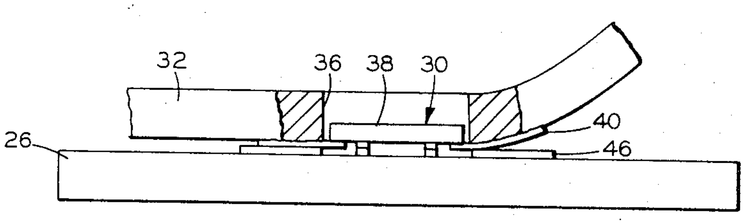
FIG. 15 is an illustration of an alternate embodiment of the invention for detecting unsound bonds.
Figure 16:
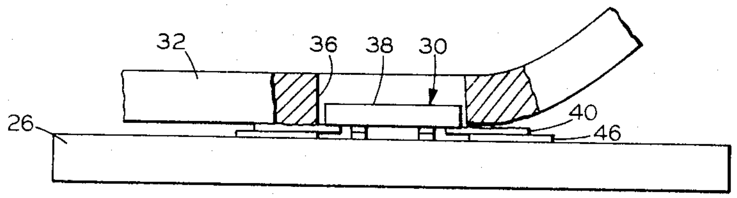
FIG. 16 is an illustration of the embodiment of FIG. 15 in a situation where bonds are sound.

Thus, it can be seen that from two points of view, i.e., differences in area and differences in bond strengths per unit area, the bond strength between the strip 32 and the lead 40 is substantially weaker than the bond strength between the lead 40 and the conductive element 46. This differential bond strength can be used to great advantage in that the strip 32 can be used directly as a device for evaluating soundness of bonding between the leads 40 and the conductive elements 46. If the bonds between the leads 40 and the conductive elements 46 are, in fact, sound, then it is clear that when the strip 32 is peeled away the bonding between the strip 32 and the leads 40 tears away, as illustrated in FIG. 15. In other words, the technique described above is capable of combining the strip 32 with the leads 40 with a predetermined releasability. Of course, it can be recognized, if the bond strength between the leads 40 and the conductive elements 46 is unsound then the lifting away of the strip 32 peels the leads 40 which are unsoundly bonded to the conductive elements 46 away from the conductive elements because of the bonding between the strip and the leads.

A significant advantage of this arrangement is that the soundness of bonding of each of the leads 40 to the associated one of the conductive elements 46 can be determined independently. In other words, even if 15 leads of a 16-lead, integrated-circuit chip were bonded soundly, the use of the above-described technique would identify an unsoundly bonded one of the leads. This capability of identifying one unsoundly bonded lead among a large group of soundly bonded leads is not attainable within any heretofore known testing arrangement for this type of device.

By properly defining parameters in this system it is possible to specify bond strengths for a high-volume manufacturing operation in terms which correlate with the releasiblity of the bonding between the strip 32 and the leads 40. The technique of bonding a strip 32 to the tops of the leads 40 has been described with respect to its applicability in the field compliant bonding. However, it must be noted that the utility of such a technique is not limited to the field of compliant bonding. It is possible for the strip 32 to be secured to the tops of the leads 40 by some bonding arrangement other than ultrasonic, for instance, adhesive bonding with a predetermined releasiblity may be used.

Figure 17:
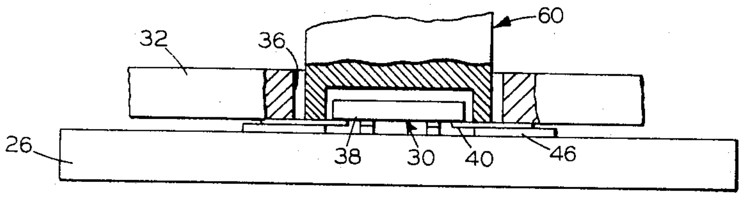
FIG. 17 is an illustration of a situation in which a chip has been incorporated with a flexible member by bonding but wherein bonding of the leads to conductive elements takes place with a shaped thermocompression bonding tool.

It is also possible that the chip 30 might be bonded into its position on the substrate 26 using a shaped bonding tool 50, such as that illustrated in FIG. 17. In this case, the leads 40 would be bonded without the use of strip 32 as a compliant bonding medium. However, the capability of evaluating the soundness of the bonding between the leads 40 and the conductive elements 46 would still be available. The differences in contact area which were illustrated in FIG. 14 would still develop because the leads 40 would be spread out by the bonding tool 60 and the differences in bond strength per unit area which were described above in connection with FIGS. 13 and 14 would still exist because the bonding between the strip 32 and the leads 40 could be made to have an equivalent strength per unit area less than that of the thermocompression type of bonding which would result from use of the tool 60 on the leads.

Although the utility of the strip 32 has been discussed at great length with respect to evaluation of bond strengths, it should not be overlooked that incorporation of the integrated-circuit chips 30 with the strip 32 provides a very convenient means for introducing the integrated circuits into an automatic bonding operation.

Although certain embodiments of the invention have been shown in the drawings and described in the specification, it is to be understood that the invention is not limited thereto, is capable of modification and can be arranged without departing from the spirit and scope of the invention.

What is claimed is:

1. A supporting strip for devices having body portions, each body portion having a first and an opposed second side and each body portion having beam leads extending from and beyond the first side, which comprises:

a flexible elongated flat member having: (a) a thickness at least equal to the thickness of the body portions of the beam lead devices that are bounded by the first and second sides, (b) means located in, and longitudinally spaced along, the elongated flat member for receiving the body portions of the devices and (c) means, associated with the receiving means, for engaging portions of the beam leads that extend from and beyond the first sides of the devices;

a strand longitudinally disposed along the elongated flat member, traversing the receiving means and engaging the first sides of the body portions, for retaining the body portions in the receiving means and for maintaining the beam leads against the engaging means of the elongated flat member; and means for retaining the strand against the elongated flat member, whereby the devices are supported in such member.

2. The supporting strip of claim 1, wherein the strand has a predetermined releasability so that, when the beam leads of the devices are bonded to a substrate and the elongated member is pulled, the strand ruptures the bonds if the bonds are unsound, and yields the strand beyond a predetermined limit if the bonds are sound.

3. In an apparatus for compliant bonding of devices having body portions, each body portion having a first and an opposed second side and each body portion having beam leads extending from and beyond the first side:

an elongated flat strip of a compliant bonding medium having: (a) a thickness at least equal to the thickness of the body portions lying between the first and second sides, (b) means located in, and longitudinally spaced along, the elongated flat strip for receiving the body portions of the devices, and (c) means, associated with the receiving means, for engaging the portions of the beam leads that extend from and beyond the first sides of the devices; and a strand longitudinally disposed along and mounted to the elongated flat strip for retaining the body portions of the devices in the receiving means and for maintaining the beam leads held against the engaging means of the elongated flat strip.

4. The apparatus of claim 3, wherein the strand has a predetermined releasability that is sufficiently high so that upon the bonding of the beam leads of the devices to a substrate, unsound bonds are pulled away from the substrate by pulling on the strand but is also sufficiently low so that the strand does not yield when the bonds are sound.

5. The apparatus of claim 3, wherein the strand mounted to the elongated flat strip is threaded: (a) across the upper surface of the strip opposite the surface of the strip containing the engaging means against which the leads are held by the strand, (b) down through the receiving means, (c) under the body portions of the devices, and (d) back up through the receiving means to lie along the uppersurface.

* * * * *

UNITED STATES PATENT OFFICE
CERTIFICATE OF CORRECTION

Patent No. 3,765,845 Dated October 16, 1973

Inventor(s) BENJAMIN H. CRANSTON

It is certified that error appears in the above-identified patent and that said Letters Patent are hereby corrected as shown below:

Col. 1, line 8 (Spec. p. 1, line 3) cancel "methods of and", line 31 (Spec. p. 1, line 23) "frequencly" should be --frequently--.

Col. 2, line 30 (Spec. p. 3, line 17) "a method of" should be --an apparatus for--, line 33 (Spec. p. 3, line 20) cancel "a", line 34 (Spec. p. 3, line 21) "method by " should be --an apparatus with--.

Col. 3, line 26 (Spec. p. 5, line 11) after "engaged" by bonding was omitted.

Signed and sealed this 6th day of August 1974.

(SEAL)
Attest:

McCOY M. GIBSON, JR.
Attesting Officer

C. MARSHALL DANN
Commissioner of Patents